US012637199B2

(12) United States Patent
Wang et al.

(10) Patent No.: US 12,637,199 B2
(45) Date of Patent: May 26, 2026

(54) FIXED-WING UNMANNED AERIAL VEHICLE HAVING A LARGE FUSELAGE

(71) Applicant: AUTEL ROBOTICS CO., LTD., Shenzhen (CN)

(72) Inventors: Kangli Wang, Shenzhen (CN); Ao He, Shenzhen (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 18/512,340

(22) Filed: Nov. 17, 2023

(65) Prior Publication Data

US 2024/0166329 A1 May 23, 2024

(30) Foreign Application Priority Data

Nov. 18, 2022 (CN) .......................... 202211449538.1

(51) Int. Cl.
B64C 1/26 (2006.01)
B64U 20/40 (2023.01)
(Continued)

(52) U.S. Cl.
CPC ................ B64C 1/26 (2013.01); B64U 20/40 (2023.01); B64U 30/14 (2023.01); B64U 80/50 (2023.01)

(58) Field of Classification Search
CPC .......... B64C 1/26; B64U 20/40; B64U 30/14; B64U 80/50; A63H 27/02
See application file for complete search history.

(56) References Cited

U.S. PATENT DOCUMENTS 3,827,181 A * 8/1974 Mabuchi ................ A63H 27/02
                                                446/57
4,233,773 A * 11/1980 Jones ..................... A63H 27/02
                                                446/34
(Continued)

FOREIGN PATENT DOCUMENTS

CN          203585018 U      5/2014
CN          107600414 A      1/2018
(Continued)

OTHER PUBLICATIONS

The First Chinese Office Action dated Mar. 17, 2025; Appln. No 202211449538.1 with English Translation.

*Primary Examiner* — Philip J Bonzell
(74) *Attorney, Agent, or Firm* — Frank gao, Esq.

(57) ABSTRACT

The present disclosure discloses an unmanned aerial vehicle. The unmanned aerial vehicle includes a wing and a fuselage that are detachably connected to each other, a first protruding portion and a second protruding portion are formed at a position of the fuselage that corresponds to the wing, the first protruding portion and the second protruding portion are arranged opposite to each other, a mounting groove configured to accommodate a middle portion of the wing is formed between the first protruding portion and the second protruding portion, a mounting hole is formed on the first protruding portion and/or the second protruding portion, a pin hole is formed at a position of the middle portion of the wing that corresponds to the mounting hole, an index pin is arranged on the fuselage, the index pin is fixed on the first protruding portion and/or the second protruding portion, the index pin includes a bolt, and the bolt partially runs through the mounting hole and extends into the pin hole. In the present disclosure, the wing and the fuselage can be connected through the index pin. Therefore, the wing and the fuselage may be detachably connected to each other and conveniently (Continued)

detached from each other. In addition, through cooperation among the first protruding portion, the second protruding portion and the wing, flight and aerodynamic performance of the unmanned aerial vehicle can be ensured, and an appearance is aesthetic and concise.

7 Claims, 6 Drawing Sheets

(51) Int. Cl.
    *B64U 30/14*          (2023.01)
    *B64U 80/50*          (2023.01)

(56)             References Cited

U.S. PATENT DOCUMENTS

| 4,591,114 | A | * | 5/1986 | Block | .................... | H01R 35/00 |
|---|---|---|---|---|---|---|
| | | | | | | 244/1 R |

| 6,144,899 | A | * | 11/2000 | Babb | ..................... | B64D 17/80 |
|---|---|---|---|---|---|---|
| | | | | | | 701/16 |
| 6,726,148 | B2 | * | 4/2004 | Carroll | .................... | F02B 75/34 |
| | | | | | | 206/335 |
| 10,988,253 | B2 | * | 4/2021 | Perry | .................... | B64U 10/25 |
| 2003/0057325 | A1 | * | 3/2003 | Carroll | .................. | B64U 80/50 |
| | | | | | | 244/120 |

FOREIGN PATENT DOCUMENTS

| CN | 107697265 | A | | 2/2018 | | |
|---|---|---|---|---|---|---|
| CN | 110949654 | A | | 4/2020 | | |
| CN | 111344223 | A | * | 6/2020 | ............. | B64C 1/061 |
| CN | 113955075 | A | * | 1/2022 | | |
| CN | 118419249 | A | * | 8/2024 | ............. | B64C 1/062 |
| KR | 101808855 | B1 | | 12/2017 | | |
| KR | 102773225 | B1 | * | 8/2024 | | |
| WO | 2019028071 | A1 | | 2/2019 | | |
| WO | WO-2023014388 | A1 | * | 2/2023 | ............. | B64C 1/061 |

* cited by examiner

FIXED-WING UNMANNED AERIAL VEHICLE HAVING A LARGE FUSELAGE

This application is filed based upon and claims priority to Chinese patent application 202211449538.1, filed on Nov. 18, 2022 and entitled "Unmanned Aerial Vehicle" the entire disclosure of which are incorporated herein by reference for all purposes.

BACKGROUND

With the development of science and technology, unmanned aerial vehicles are increasingly widely applied in a civilian field. However, as requirements on the performance of an unmanned aerial vehicle increase, the unmanned aerial vehicle becomes increasingly larger. Especially, a fixed-wing unmanned aerial vehicle may occupy large space since a wing of the fixed-wing unmanned aerial vehicle is perpendicular to a fuselage thereof. Therefore, it is quite inconvenient to transport or store the unmanned aerial vehicle.

SUMMARY

The present disclosure relates to the field of unmanned aerial vehicle devices, and specifically, to an unmanned aerial vehicle.

The present disclosure mainly provides an unmanned aerial vehicle and a fuselage assembly thereof, to resolve a problem of inconvenience in transporting or storing an existing unmanned aerial vehicle since the unmanned aerial vehicle occupies large space.

According to the first aspect of the present disclosure provides an unmanned aerial vehicle. The unmanned aerial vehicle includes a wing and a fuselage that are detachably connected to each other, a first protruding portion and a second protruding portion are formed at a position of the fuselage that corresponds to the wing, the first protruding portion and the second protruding portion are arranged opposite to each other, a mounting groove configured to accommodate a middle portion of the wing is formed between the first protruding portion and the second protruding portion, a mounting hole is formed on the first protruding portion and/or the second protruding portion, a pin hole is formed at a position of the middle portion of the wing that corresponds to the mounting hole, an index pin is arranged on the fuselage, the index pin is fixed on the first protruding portion and/or the second protruding portion, the index pin includes a bolt, and the bolt partially runs through the mounting hole and extends into the pin hole.

BRIEF DESCRIPTION OF THE DRAWINGS

To describe the technical solutions in implementations of the present disclosure more clearly, the following briefly describes the accompanying drawings required for describing the implementations. Apparently, the accompanying drawings in the following description show merely some implementations of the present disclosure, and a person of ordinary skill in the art may still derive other accompanying drawings from these accompanying drawings without creative efforts.

DETAILED DESCRIPTION

The technical solutions in the implementations of the present disclosure are clearly and completely described in the following with reference to the accompanying drawings in the implementations of the present disclosure. Apparently, the described implementations are merely some implementations of the present disclosure rather than all of the implementations. All other implementations obtained by a person of ordinary skill in the art based on the implementations of the present disclosure without creative efforts shall fall within the protection scope of the present disclosure.

The terms used in the implementations of the present disclosure are merely used for illustrating specific implementations, and are not intended to limit the present disclosure. The terms "a", "said", and "the" of singular forms used in the implementations and the appended claims of the present disclosure are also intended to include plural forms, unless otherwise specified in the context clearly; and "a plurality of" generally means including at least two, but does not exclude a case of including at least one.

It should be understood that, the term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, the terms "include", "comprise", and any variants thereof used in this specification are intended to cover non-exclusive inclusion. Therefore, a process, method, object or device that includes a series of elements not only includes such elements, but also includes other elements that are not expressly listed, or further include elements inherent to such a process, method, object or device. Without more limitations, an element defined by a sentence "include . . . " does not exclude that there are still other same elements in the process, method, object or device.

Figure 1:
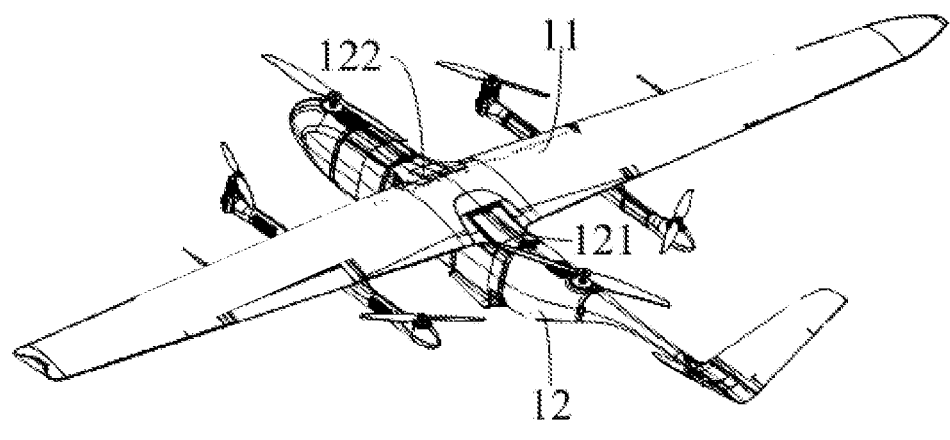
FIG. 1 is an overall schematic structural diagram of an implementation of an unmanned aerial vehicle according to the present disclosure.
Figure 2:
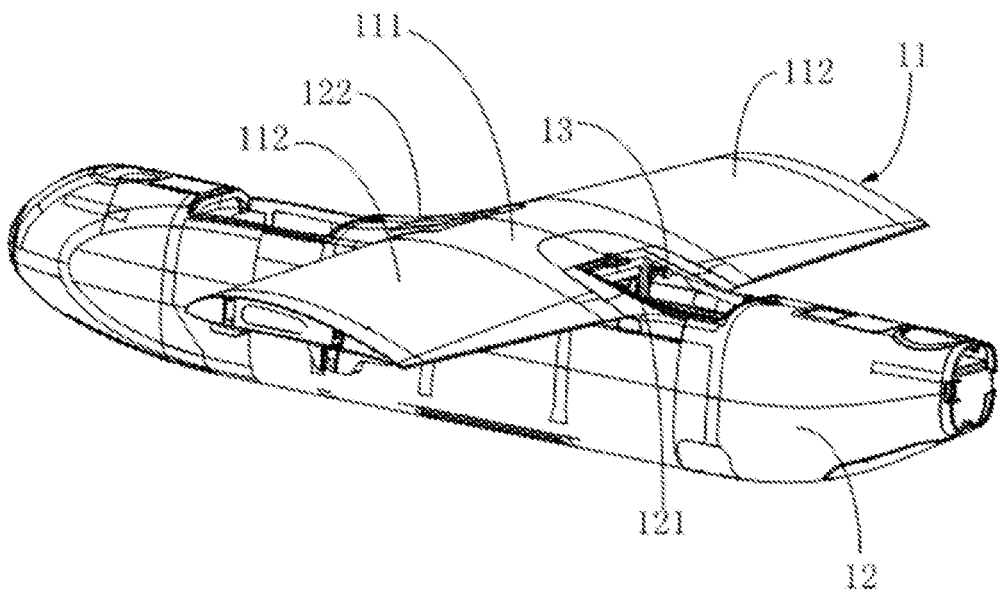
FIG. 2 is a partial schematic structural diagram of the unmanned aerial vehicle in FIG. 1.
Figure 3:
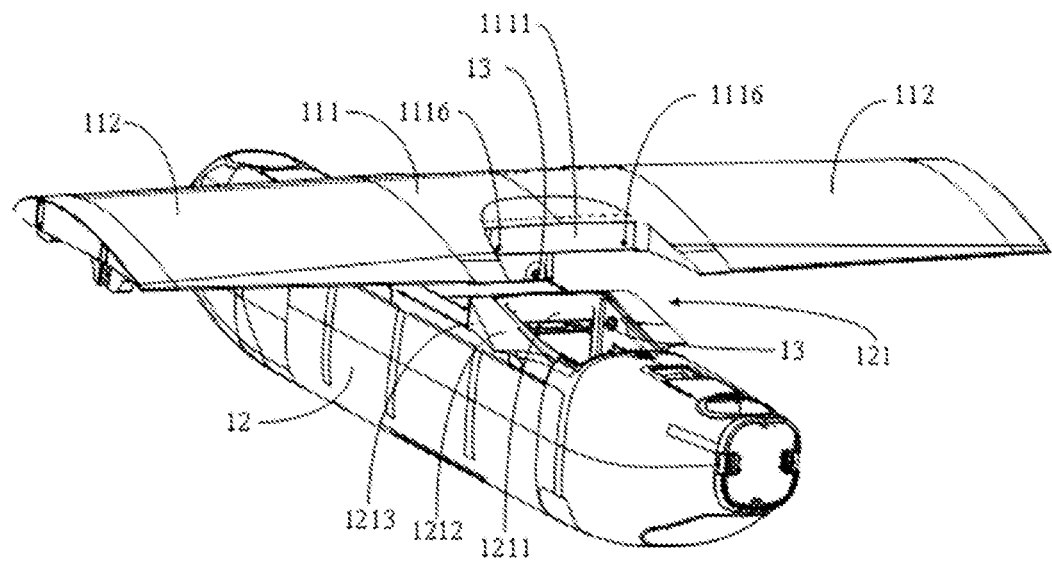
FIG. 3 is a schematic structural diagram in which a fuselage and a wing of the unmanned aerial vehicle in FIG. 2 are separated.
Figure 4:
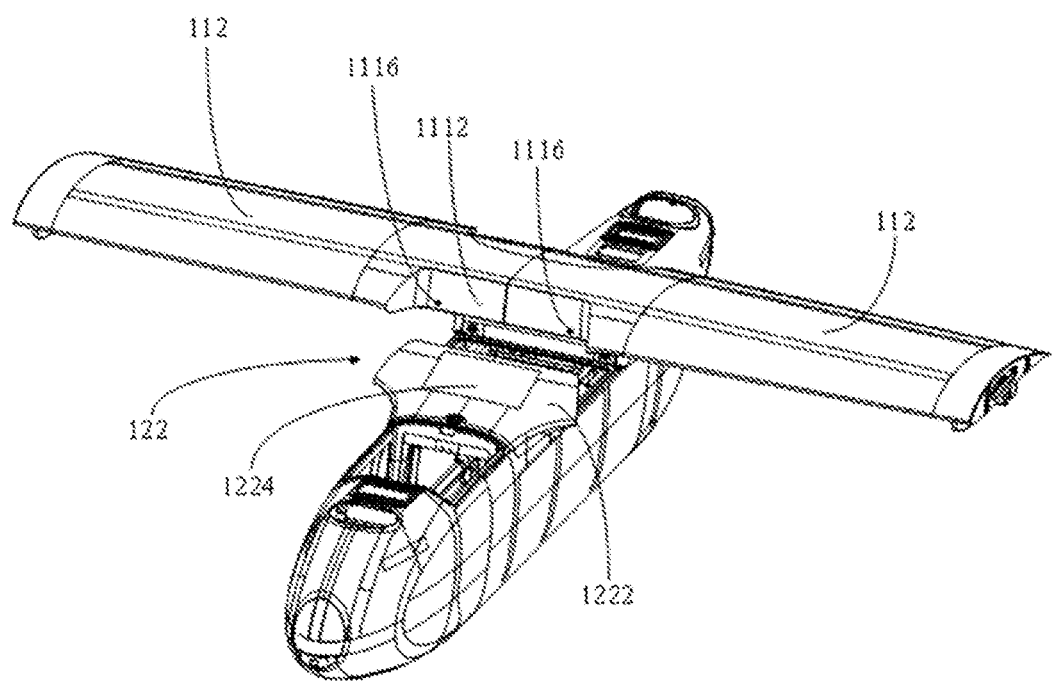
FIG. 4 is a schematic structural diagram of the unmanned aerial vehicle in FIG. 3 from another perspective.

Referring to FIG. 1 to FIG. 4, FIG. 1 is an overall schematic structural diagram of an implementation of an unmanned aerial vehicle according to the present disclosure. FIG. 2 is a partial schematic structural diagram of the unmanned aerial vehicle in FIG. 1, FIG. 3 is a schematic structural diagram in which a fuselage and a wing of the unmanned aerial vehicle in FIG. 2 are separated, and FIG. 4 is a schematic structural diagram of the unmanned aerial vehicle in FIG. 3 from another perspective. In this implementation, a fuselage assembly includes a wing 11 and a fuselage 12 that are detachably connected to each other.

A first protruding portion 121 and a second protruding portion 122 are formed at a position of the fuselage 12 that corresponds to the wing 11. The first protruding portion 121 and the second protruding portion 122 are arranged opposite to each other, and a mounting groove (not marked) configured to accommodate a middle portion of the wing 11 is formed between the first protruding portion and the second protruding portion. A mounting hole (not marked) is formed on the first protruding portion 121 and/or the second protruding portion 122, and a pin hole 1116 is formed at a position of the middle portion of the wing 11 that corresponds to the mounting hole. An index pin 13 is arranged on the fuselage 12, the index pin 13 is fixed on the first protruding portion 121 and the second protruding portion 122, and the index pin 13 partially runs through the mounting hole and extends into the pin hole 1116. The foregoing description is a state after the wing 11 and the fuselage 12 are combined. When the wing 11 and the fuselage 12 need to be separated, the wing 11 may be detached from the fuselage 12 only by pulling the index pin 13 to take out the part of the index pin that is inserted into the pin hole 1116. Similarly, during assembly, the index pin 13 is also pulled to retract a protruding part of the index pin to the mounting hole, the wing 11 is then placed in the groove between the first protruding portion 121 and the second protruding portion 122, the pin hole 1116 is aligned with the mounting hole, and the index pin 13 is then released to extend the protruding part of the index pin into the pin hole 1116, so that the wing 11 is fixed. In this implementation, two pin holes 1116 are formed on a side surface of the wing 11 that corresponds to the first protruding portion 121, and two pin holes are also formed on a side surface of the wing that corresponds to the second protruding portion 122. That is, four pin holes 1116 are provided on the wing 11 in total, which are located on front and rear sides and are spaced apart from each other, to enhance the connection stability between the fuselage 12 and the wing 11. In other implementations, quantities of the pin holes 1116 and the index pins 13 may be adjusted based on a required connection strength, and the quantities may be increased or reduced. Alternatively, the mounting hole and the index pin 13 are provided on only one of the first protruding portion 121 or the second protruding portion 122, and the other may be clamped to, abut against, or be in interference fit with the wing to enhance fixing.

Figure 5:
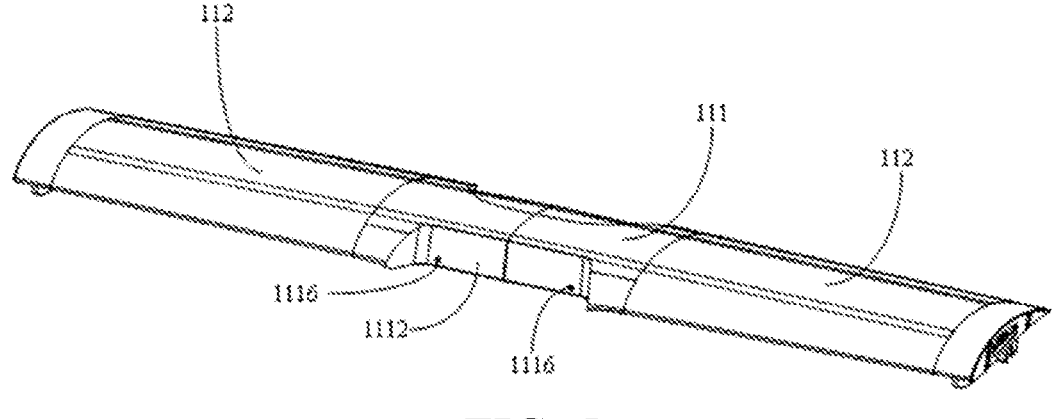
FIG. 5 is a schematic structural diagram of the wing part in FIG. 4.
Figure 6:
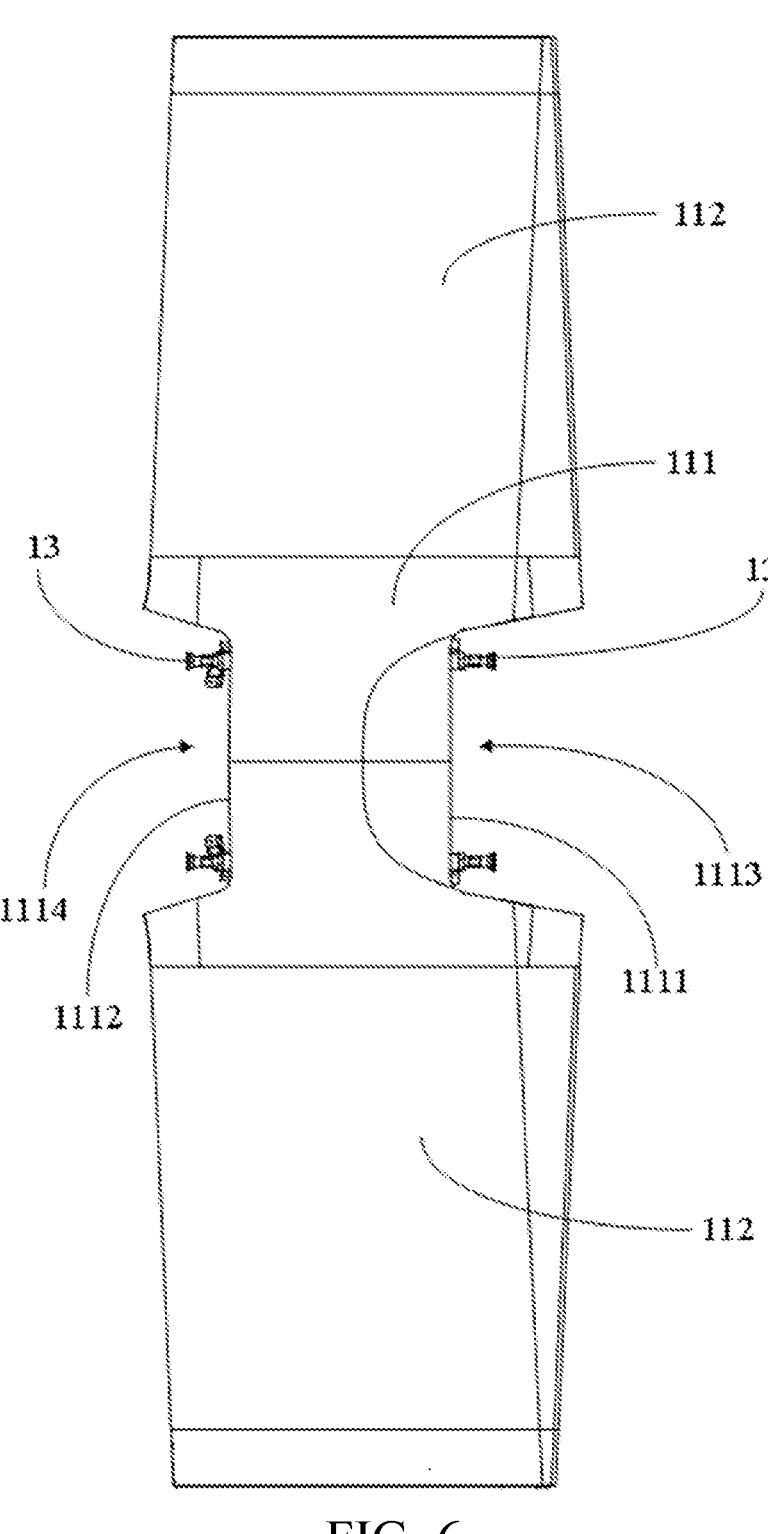
FIG. 6 is a top view of a wing part in FIG. 1.

Further referring to FIG. 5 and FIG. 6, FIG. 5 is a schematic structural diagram of the wing part in FIG. 4, and FIG. 6 is a top view of a wing part in FIG. 1. The middle portion of the wing 11 includes a first contact surface 1111, a second contact surface 1112, and a third contact surface (not marked). The first contact surface 1111 abuts against a side surface of the first protruding portion 121 that faces the second protruding portion 122, and the second contact surface 1112 abuts against a side surface of the second protruding portion 122 that faces the first protruding portion 121. The third contact surface abuts against a surface of the fuselage 12 that is located at a bottom portion of the mounting groove, and a shape of the mounting groove adapts to a shape of the middle portion of the wing 11. A first groove 1113 and a second groove 1114 are formed on the middle portion of the wing 11, the first contact surface 1111 is a bottom surface of the first groove 1113, and the second contact surface 1112 is a bottom surface of the second groove 1114. The first protruding portion 121 is arranged in the first groove 1113, and the second protruding portion 122 is arranged in the second groove 1114. In this implementation, the wing 11 includes a connection portion 111 and two wing portions 112. The two wing portions 112 are connected to two opposite sides of the connection portion 111, the first groove 1113 and the second groove 1114 are formed on another two opposite sides of the connection portion 111, and the pin hole 1116 is formed in the first contact surface 1111 of the first groove 1113 and the second contact surface 1112 of the second groove 1114. Specifically, the connection portion 111 of the wing 11 is I-shaped, the two sides are respectively the first groove 1113 and the second groove 1114, and the another two sides have a same length and are respectively connected to the two wing portions 112.

To ensure whole streamline shapes of the wing and the unmanned aerial vehicle, and cause the wing and the unmanned aerial vehicle to better meet the aerodynamics, an average thickness of the connection portion 111 is greater than an average thickness of the wing portion 112; and in addition, heights of the first protruding portion 121, the second protruding portion 122, the first contact surface 1111 and the second contact surface 1112 are less than the average thickness of the connection portion 111.

Figure 7:
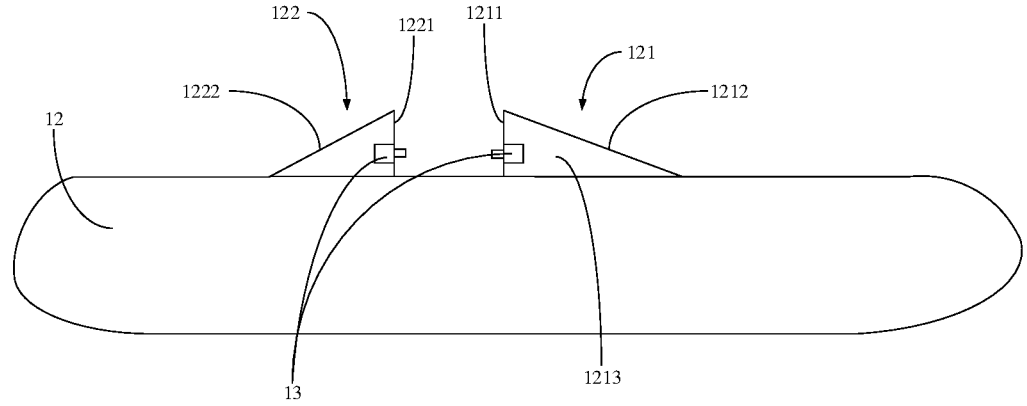
FIG. 7 is a side structural block diagram of the fuselage in FIG. 4.

Further referring to FIG. 7, FIG. 7 is a side structural block diagram of the fuselage in FIG. 4. In this implementation, the first protruding portion 121 includes a first connection wall 1211 and a first inclined wall 1212, the second protruding portion 122 includes a second connection wall 1221, a second inclined wall 1222 and two second side walls 1223. A mounting hole is formed on the first connection wall 1211 and the second connection wall 1221, and the first inclined wall 1212 is arranged downward and inclinedly along a top end of the first connection wall 1211. Further referring to FIG. 9, the index pin 13 is connected and fixed to a surface of the first connection wall 1211 that is away from the connection portion 111 of the wing 11, the index pin 13 includes a bolt 133, and the bolt 133 corresponds to the mounting hole and can extend out of or retract to the first connection wall 1211 along the mounting hole. The second inclined wall 1222 is arranged downward and inclinedly along a top end of the second connection wall 1221, and the two second side walls 1223 are connected to the second inclined wall 1222 and two opposite sides of the second connection wall 1221 to form an accommodating space. The index pin 13 is connected and fixed to a surface of the second connection wall 1221 that is away from the connection portion 111 of the wing 11 and is located in the accommodating space. An opening and a cover body 1224 that is movably connected to the second inclined wall 1222 or the fuselage 12 are formed on the second inclined wall 1222. The cover body 1224 can cover the opening. When the cover body is opened, the accommodating space is exposed, a mount or pull operation of the index pin 13 can be performed; and after the operation is ended, the cover body 1224 may cover the opening, so that an exposed resistance source may not be formed on a surface of the fuselage. Therefore, flight and aerodynamic performance of the unmanned aerial vehicle is improved, and an appearance is aesthetic and concise A width of the first inclined wall 1212 may be greater than a width of the first connection wall 1211, and a width of the second inclined wall 1222 may be greater than a width of the second connection wall 1221. In addition, the first protruding portion 121 is not provided with a side wall, so that the index pin 13 may be mounted on the first connection wall 1211 from a side surface, and an opening and a cover body may not be provided on the first inclined wall 1212. In this implementation, the first protruding portion 121 is located on a side that is closer to a tail portion of the fuselage 12, and the second protruding portion 122 is located on a side that is closer to a head portion of the fuselage 12. In other implementations, positions of the first protruding portion 121 and the second protruding portion 122 may be exchanged, and structures thereof may also be exchanged. For example, the first protruding portion 122 also includes a side wall, or the second protruding portion 122 does not include the second side walls 1223, which may be selected based on an actual requirement.

Figure 8:
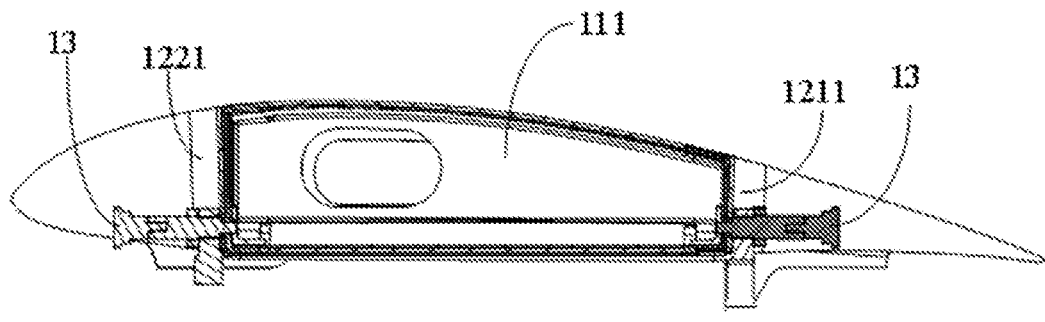
FIG. 8 is a partial structural cross-sectional view of the unmanned aerial vehicle in FIG. 2.
Figure 9:
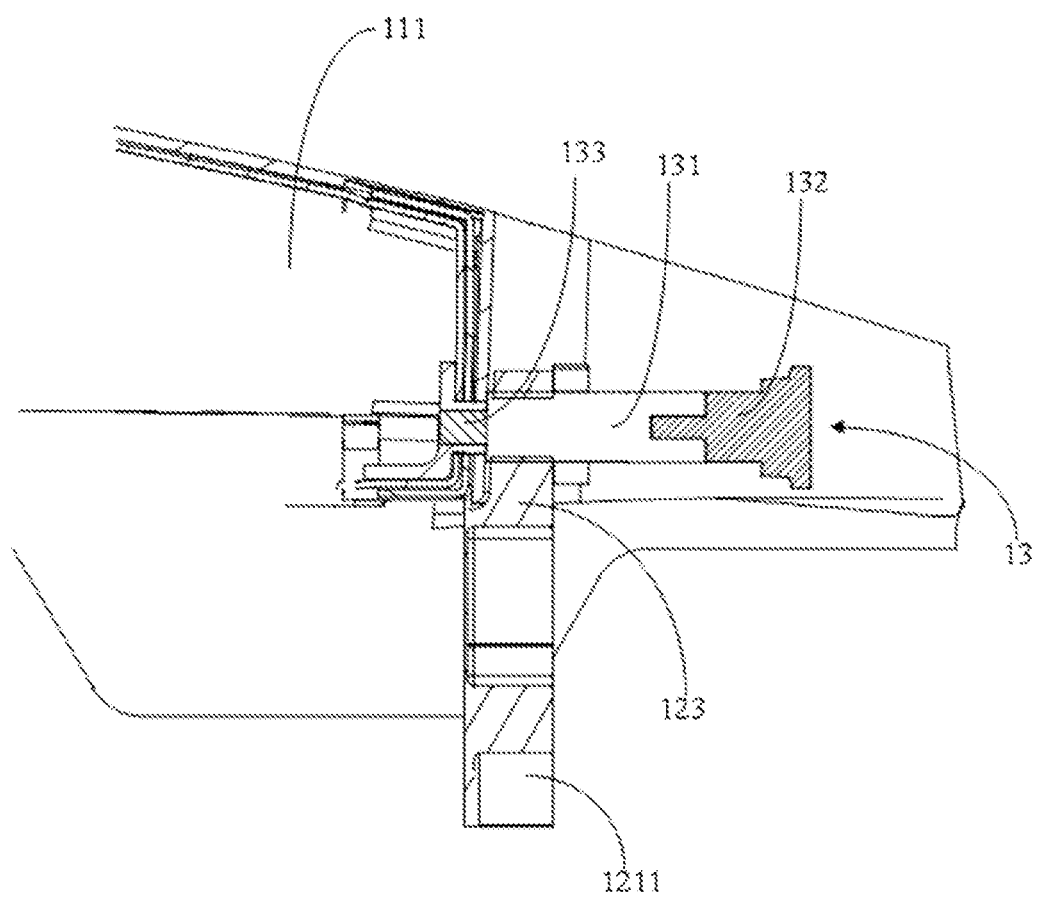
FIG. 9 is a partial structural enlarged view of FIG. 8.

Further referring to FIG. 8 and FIG. 9, FIG. 8 is a partial structural cross-sectional view of the unmanned aerial vehicle in FIG. 2, and FIG. 9 is a partial structural enlarged view of FIG. 8. To enhance connection strengths between the index pin 13 with the first connection wall 1211 and the second connection wall 1221, a fuselage flange 123 is arranged on the first connection wall 1211 and the second connection wall 1221, a mounting hole is formed on the fuselage flange 123, and the index pin 13 is connected to the fuselage flange 123. Positions at which the fuselage flange 123 is arranged on the first connection wall 1211 and the second connection wall 1221 may be circular holes, the fuselage flange 123 is arranged in the circular hole, and the first connection wall 1211 and the second connection wall 1221 are connected to the fuselage flange 123 in a bonding, welding or threaded manner. Specifically, the index pin 13 includes a pin body 131, an elastic member, a bolt 133, and a knob 132. The bolt 133 is connected to the knob 132, the knob 132 is connected to the pin body 131 through the elastic member, a through hole is formed in the pin body 131, a part of the bolt 133 is located in the through hole and the other part is arranged protruding from the pin body 131, the fuselage is connected and fixed to the fuselage flange 123, and the part of the bolt 133 protruding from the pin body 131 can enter and exit the pin hole 1116 of the connection portion 111 of the wing 11. A groove is formed on a side of the pin body 131 of the index pin 13 that is connected to the knob 132, and a clamping portion arranged in the groove is formed on the knob 132. When the knob 132 is pulled out, the elastic member is driven to deform and force is accumulated, to drive the bolt 133 to move toward a direction separating from the pin hole 1116, and when the clamping portion completely separates from the groove, the bolt 133 also completely separates from the pin hole 1116. In this case, the knob 132 is rotated, and the clamping portion and the groove are misaligned. That is, the knob 132 is clamped on a side of the pin body 131 that is away from the pin hole 1116. Therefore, the bolt 133 can be kept in a state of separating from the pin hole 1116 without external force, which facilitates disassembly and assembly of the wing 11 and the fuselage 12.

Preferably, the first connection wall 1211 and the second connection wall 1221 are parallel to each other and are both perpendicular to the fuselage 12. The bolt 133 of the index pin 13 corresponds to the mounting hole and can extend out of or retract to the second connection wall 1221 along the mounting hole. A distance between the first protruding portion 121 and the second protruding portion 122 is equal to a distance between the first groove 1113 and the second groove 1114, the first contact surface 1111 and the second contact surface 1112 are flat surfaces, a surface of the first protruding portion 121 that abuts against the first contact surface 1111 is a flat surface, and a surface of the second protruding portion 122 that abuts against the second contact surface 1112 is a flat surface. Through this arrangement manner, connection between the wing 11 and the fuselage 12 becomes more tight, and a gap between the wing and the fuselage is reduced as much as possible, to avoid a great jitter of the wing during flight.

The unmanned aerial vehicle described in the present disclosure may be a fixed-wing unmanned aerial vehicle, or may be a fixed-wing and rotary-wing hybrid unmanned aerial vehicle, and is applicable to various unmanned aerial vehicle including a fuselage and a wing.

In the foregoing manner, the wing and the fuselage are connected through the index pin.

The middle portion of the wing includes a first contact surface, a second contact surface and a third contact surface, the first contact surface abuts against a side surface of the first protruding portion that faces the second protruding portion, the second contact surface abuts against a side surface of the second protruding portion that faces the first protruding portion, the third contact surface abuts against a surface of the fuselage that is located at a bottom portion of the mounting groove, and a shape of the mounting groove adapts to a shape of the middle portion of the wing.

A first groove and a second groove are formed on the middle portion of the wing, the first contact surface is a bottom surface of the first groove, the second contact surface is a bottom surface of the second groove, the first protruding portion is arranged in the first groove, and the second protruding portion is arranged in the second groove.

The wing includes a connection portion and two wing portions, the two wing portions are connected to two opposite sides of the connection portion, the first groove and the second groove are formed on another two opposite sides of the connection portion, and the pin hole is formed in the first groove and the second groove.

An average thickness of the connection portion is greater than an average thickness of the wing portion, and heights of the first protruding portion, the second protruding portion, the first contact surface and the second contact surface are less than the average thickness of the connection portion.

The first protruding portion includes a first connection wall and a first inclined wall, a mounting hole is formed on the first connection wall, the first inclined wall is arranged downward and inclinedly along a top end of the first connection wall, the index pin is connected and fixed to a surface of the first connection wall that is away from the connection portion of the wing, and the bolt of the index pin corresponds to the mounting hole and extends out of or retracts to the first connection wall along the mounting hole.

The second protruding portion includes a second connection wall, a second inclined wall and two second side walls, a mounting hole is formed on the second connection wall, the second inclined wall is arranged downward and inclinedly along a top end of the second connection wall, the two second side walls are connected to the second inclined wall and two opposite sides of the second connection wall to form an accommodating space, an opening and a cover body that are movably connected to each other are formed on the second inclined wall, the index pin is connected and fixed to a surface of the second connection wall that is away from the connection portion of the wing, and the bolt of the index pin corresponds to the mounting hole and extends out of or retracts to the second connection wall along the mounting hole.

A fuselage flange is arranged on the first connection wall and the second connection wall, the mounting hole is formed on the fuselage flange, the index pin further includes a pin body, an elastic member and a knob, the bolt is connected to the knob, the knob is connected to the pin body through the elastic member, a through hole is formed in the pin body, a part of the bolt is located in the through hole and the other part is arranged protruding from the pin body, the fuselage is connected and fixed to the fuselage flange, and the part of the bolt protruding from the pin body enters and exits the pin hole of the connection portion of the wing.

The connection portion of the wing is I-shaped, the two sides are respectively the first groove and the second groove, and the another two sides have a same length and are respectively connected to the two wing portions.

A distance between the first protruding portion and the second protruding portion is equal to a distance between the first groove and the second groove, the first contact surface and the second contact surface are flat surfaces, a surface of the first protruding portion that abuts against the first contact surface is a flat surface, and a surface of the second protruding portion that abuts against the second contact surface is a flat surface.

According to the foregoing solutions, the wing and the fuselage are connected through the index pin. Therefore, the wing and the fuselage may be detachably connected to each other and conveniently detached from each other. In addition, through cooperation among the first protruding portion, the second protruding portion and the wing, flight and aerodynamic performance of the unmanned aerial vehicle can be ensured, and an appearance is aesthetic and concise.

Therefore, the wing and the fuselage may be detachably connected to each other and conveniently detached from each other. In addition, through cooperation among the first protruding portion, the second protruding portion and the wing, flight and aerodynamic performance of the unmanned aerial vehicle can be ensured, and an appearance is aesthetic and concise.

The foregoing only describes implementations of the present disclosure, and the protection scope of the present disclosure is not limited thereto. All equivalent structure or process changes made according to the content of this specification and accompanying drawings in the present disclosure or by directly or indirectly applying the present disclosure in other related technical fields shall fall within the protection scope of the present disclosure.

What is claimed is:

1. An unmanned aerial vehicle, wherein the unmanned aerial vehicle comprises a wing and a fuselage that are detachably connected to each other;

a first protruding portion and a second protruding portion are formed as a mounting groove to accommodate with a portion of the wing;

a fastening component, comprising a first index pin, is configured to removably secure the wing in the mounting groove, wherein the first protruding portion comprises a first connection wall and a first inclined wall, a mounting hole is formed on the first connection wall, the first inclined wall is arranged downward and inclinedly along a top end of the first connection wall, the first index pin is connected and fixed to a surface of the first connection wall that is away from a connection portion of the wing, and a bolt of the first index pin corresponds to the mounting hole and extends out of or retracts into the first connection wall along the mounting hole, wherein the wing comprises a connection portion and two wing portions, an average thickness of the connection portion is greater than an average thickness of the wing portions, wherein the mounting groove is configured to accommodate a middle portion of the wing, wherein the middle portion of the wing comprises a first contact surface, a second contact surface and a third contact surface, the first contact surface abuts against the first connection wall that faces the second protruding portion, the second contact surface abuts against a side surface of the second protruding portion that faces the first protruding portion, the third contact surface abuts against a surface of the fuselage that is located at a bottom portion of the mounting groove, and a shape of the mounting groove adapts to a shape of the middle portion of the wing, wherein a first groove and a second groove are formed on the middle portion of the wing, the first contact surface is a bottom surface of the first groove, the second contact surface is a bottom surface of the second groove, the first protruding portion is arranged in the first groove, and the second protruding portion is arranged in the second groove, wherein the two wing portions are connected to two opposite sides of the connection portion, the first groove and the second groove are formed on another two opposite sides of the connection portion, and a pin hole is formed in the first groove and the second groove, wherein heights of the first protruding portion, the second protruding portion, the first contact surface and the second contact surface are less than the average thickness of the connection portion.

2. The unmanned aerial vehicle according to claim 1, wherein the fastening component further comprises: the mounting hole is formed on the first protruding portion and/or the second protruding portion, the pin hole is formed at a position of the middle portion of the wing that corresponds to the mounting hole, the first index pin is arranged on the fuselage, the first index pin is fixed on the first protruding portion and/or the second protruding portion, the first index pin comprises the bolt, and the bolt partially runs through the mounting hole and extends into the pin hole.

3. The unmanned aerial vehicle according to claim 1, wherein the connection portion of the wing is I-shaped, the two sides are respectively the first groove and the second groove, and the another two sides have a same length and are respectively connected to the two wing portions.

4. The unmanned aerial vehicle according to claim 1, wherein a distance between the first protruding portion and the second protruding portion is equal to a distance between the first groove and the second groove, the first contact surface and the second contact surface are flat surfaces, a surface of the first protruding portion that abuts against the first contact surface is a flat surface, and a surface of the second protruding portion that abuts against the second contact surface is a flat surface.

5. The unmanned aerial vehicle according to claim 1, wherein the second protruding portion comprises a second connection wall, a second inclined wall and two second side walls, a mounting hole is formed on the second connection wall, the second inclined wall is arranged downward and inclinedly along a top end of the second connection wall, the two second side walls are connected to the second inclined wall and two opposite sides of the second connection wall to form an accommodating space, an opening and a cover body that are movably connected to each other are formed on the second inclined wall, a second index pin is connected and fixed to a surface of the second connection wall that is away from the connection portion of the wing, and the bolt of the second index pin corresponds to the mounting hole and extends out of or retracts to the second connection wall along the mounting hole.

6. The unmanned aerial vehicle according to claim 5, wherein a fuselage flange is arranged on the first connection wall and the second connection wall, the mounting hole is formed on the fuselage flange, the first or second index pin further comprises a pin body, an elastic member and a knob, the bolt is connected to the knob, the knob is connected to the pin body through the elastic member, a through hole is formed in the pin body, a part of the bolt is located in the through hole and the other part is arranged protruding from the pin body, the fuselage is connected and fixed to the fuselage flange, and the part of the bolt protruding from the pin body enters and exits the pin hole of the connection portion of the wing.

7. An unmanned aerial vehicle, wherein the unmanned aerial vehicle comprises a wing and a fuselage that are detachably connected to each other;

a first protruding portion and a second protruding portion are formed as a mounting groove to accommodate with a portion of the wing; wherein the first protruding portion comprises a first connection wall and a first inclined wall, a mounting hole is formed on the first connection wall, the first inclined wall is arranged downward and inclinedly along a top end of the first connection wall, a first index pin is connected and fixed to a surface of the first connection wall that is away from the connection portion of the wing, and a bolt of the first index pin corresponds to the mounting hole and extends out of or retracts to the first connection wall along the mounting hole, wherein the second protruding portion comprises a second connection wall, a second inclined wall and two second side walls, a mounting hole is formed on the second connection wall, the second inclined wall is arranged downward and inclinedly along a top end of the second connection wall, the two second side walls are connected to the second inclined wall and two opposite sides of the second connection wall to form an accommodating space, an opening and a cover body that are movably connected to each other are formed on the second inclined wall, a second index pin is connected and fixed to a surface of the second connection wall that is away from the connection portion of the wing, and the bolt of the index pin corresponds to the mounting hole and extends out of or retracts to the second connection wall along the mounting hole, wherein the wing comprises a connection portion and two wing portions, an average thickness of the connection portion is greater than an average thickness of the wing portions, a fastening component, comprising the first index pin, is config- ured to removably secure the wing in the mounting groove, wherein the mounting groove is configured to accommodate a middle portion of the wing, wherein the fastening component further comprises; the mount- ing hole is formed on the first protruding portion and/or the second protruding portion, a pin hole is formed at a position of a middle portion of the wing that corre- sponds to the mounting hole, the index pin is arranged on the fuselage, the index pin is fixed on the first protruding portion and/or the second protruding por- tion, the index pin comprises the bolt, and the bolt partially runs through the mounting hole and extends into the pin hole, wherein the middle portion of the wing comprises a first contact surface, a second contact surface and a third contact surface, the first contact surface abuts against the first connection wall that faces the second protruding portion, the second contact sur- face abuts against a side surface of the second protrud- ing portion that faces the first protruding portion, the third contact surface abuts against a surface of the fuselage that is located at a bottom portion of the mounting groove, and a shape of the mounting groove adapts to a shape of the middle portion of the wing, wherein a first groove and a second groove are formed on the middle portion of the wing, the first contact surface is a bottom surface of the first groove, the second contact surface is a bottom surface of the second groove, the first protruding portion is arranged in the first groove, and the second protruding portion is arranged in the second groove, wherein the wing com- prises a connection portion and two wing portions, the two wing portions are connected to two opposite sides of the connection portion, the first groove and the second groove are formed on another two opposite sides of the connection portion, and a pin hole is formed in the first groove and the second groove, wherein heights of the first protruding portion, the second protruding portion, the first contact surface and the second contact surface are less than the average thickness of the connection portion.

* * * * *